May 8, 1928.　　　D. C. KERR ET AL　　　1,668,812
LEDGER AND STATEMENT SHEET
Filed Jan. 12, 1927　　2 Sheets-Sheet 2
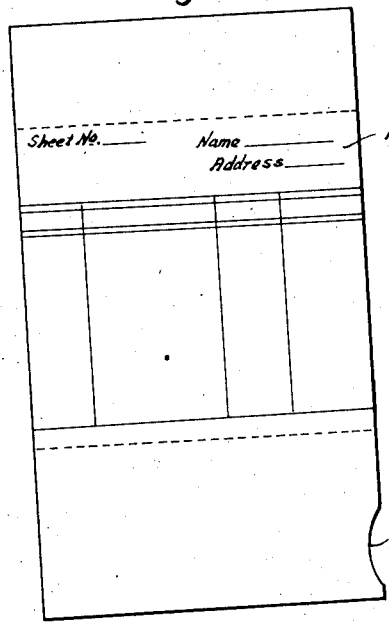
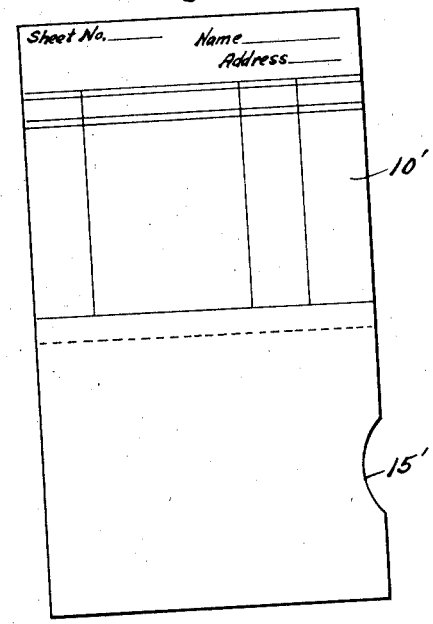
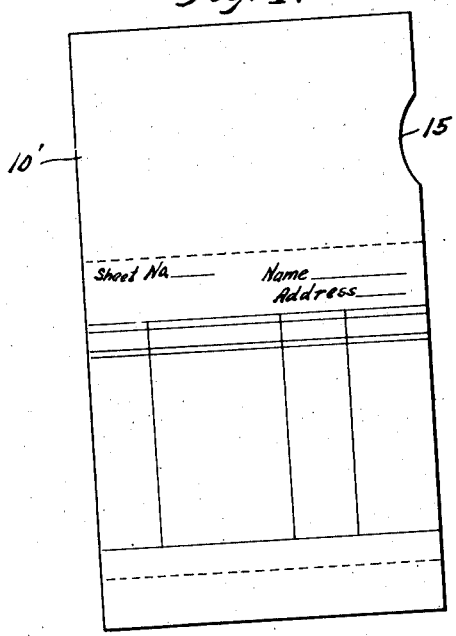
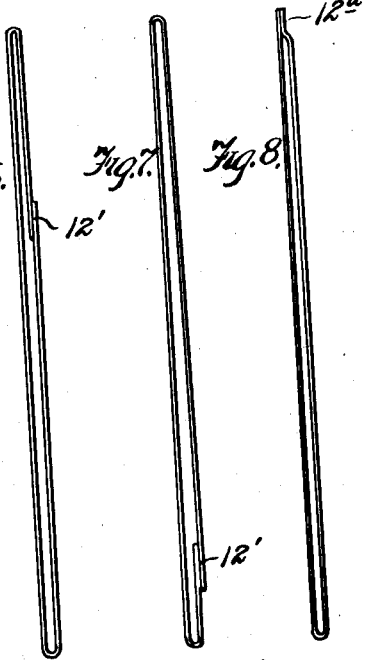
Delbert C. Kerr.
Lewis S. Jones,　INVENTORS
Victor J. Evans
ATTORNEY Patented May 8, 1928.

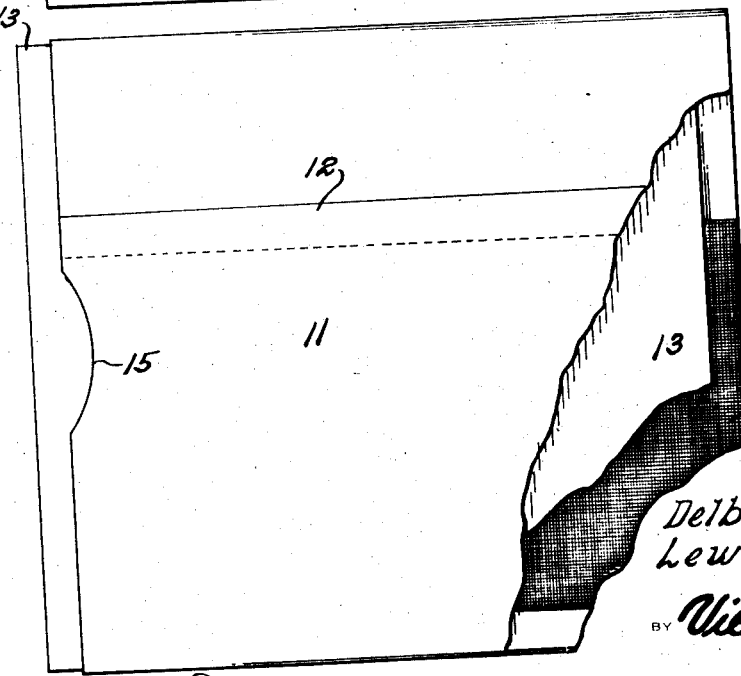

1,668,812

UNITED STATES PATENT OFFICE.

DELBERT C. KERR, OF AVALON, MISSOURI, AND LEWIS S. JONES, OF LEAVENWORTH, KANSAS.

LEDGER AND STATEMENT SHEET.

Application filed January 12, 1927. Serial No. 160,670.

This invention relates to improvements in means for producing duplicate statements, records and the like, an object being to provide a novel form of original record sheet which is arranged to provide a holder for a copy sheet, so that the latter may be readily positioned for use, and thereafter quickly separated from the original sheet, the invention being especially useful in preparing duplicate ledger and statement sheets.

With the above and other objects in view, the invention further includes the following novel features and details of construction, to be hereinafter more fully described, illustrated in the accompanying drawings and pointed out in the appended claims.

In the drawings:—

Figure 1 is a front or face view of the invention with the inserted sheet partly withdrawn.

Figure 2 is a rear or bottom view with parts broken away.

Figures 3, 4 and 5 are face views of slightly different forms of the invention.

Figures 6, 7 and 8 are edge views of Figures 3, 4 and 5 respectively.

Referring to the drawings in detail wherein like characters of reference denote corresponding parts, the invention is illustrated in Figures 1 and 2 of the drawings as arranged for use as a combined ledger and statement sheet, for use in banks and like institutions. In this form of the invention, the bank ledger sheet, referred to as the original sheet, is indicated at 10 and is provided with suitable indicia for the insertion of various items, such as the sheet number, name and address of the depositor, the old balance, the date of and checks in detail, balance brought forward, date and amount of deposits, together with the date and amount of new balance. The indicia enumerated is arranged upon the outer face of the sheet and this sheet carries a backing or bottom sheet 11. The sheets 10 and 11 are connected along opposite edges and are preferably formed of a single sheet of paper whose ends are overlapped and secured together as shown at 12. A tubular member is thus provided which is adapted to receive the copy or statement sheet indicated at 13. This last mentioned sheet is provided with indicia similar to the sheet 10, except that the spaces provided for the sheet number and name and address are omitted. This however need not necessarily be the case. Both of the sheets 10 and 13 are provided with a line which extends parallel with the bottom edge and with indicia indicating that the balance must be transferred above this line.

A carbon sheet may be inserted between the sheet 10 and the sheet 13 so that anything written upon the sheet 10 will be transferred to the sheet 13. It is preferred to form the rear face of the sheet 10 to provide a reproducing carbon as shown at 14 in Figure 2 of the drawings.

By inserting the sheet 13 within the holder provided by the sheets 10 and 11, an original and a duplicate copy may be simultaneously provided, the original forming the ledger sheet and the copy the statement sheet of a bank statement. The character of the holder provided by the sheets 10 and 11 acts to retain the sheet 13 against accidental movement while in use, whether the sheets are used in a typewriting machine, or whether the matter is inserted by hand.

It is preferred to provide the sheet 11 with a finger notch 15 so as to facilitate removal of the sheet 13.

It is apparent that the invention may be adapted for different uses as shown in Figures 3, 4 and 5 of the drawings, wherein the original or top sheet 10' is arranged for the insertion of different matter thereon. In these figures the overlapping edges of the sheets are made at the points indicated at 12' in Figures 3, 4, 5, 6 and 7, while in Figure 8 the edges are connected as indicated at 12ª. Further, the finger notch 15' may be provided in the top sheet, or in both the top and bottom sheets.

The invention is susceptible of various changes in its form, proportions and minor details of construction and the right is hereby reserved to make such changes as properly fall within the scope of the appended claims.

Having described the invention what is claimed is:—

1. A duplicate record sheet holder comprising an original sheet having a top sheet and bottom sheet connected along two opposite edges to form a tubular holder adapted to receive a copy sheet between the top and bottom sheets, a carbon face on the underside of said top sheet, said holder being insertible into a typewriter carriage with said connected edges parallel to the line of movement of the carriage.

2. A duplicate record sheet holder comprising an original sheet arranged to provide a top sheet and a bottom sheet, said sheets being connected along two opposite edges to form a tubular holder adapted to receive a copy sheet within either open end of said holder, a carbon face on the underside of said top sheet and indicia upon the upper face of the top sheet, said indicia arranged at right angles to the open edges of the sheets, said holder being insertible into a typewriter carriage with said connected edges parallel to the line of movement of the carriage.

In testimony whereof we affix our signatures.

DELBERT C. KERR.
LEWIS S. JONES.